(12) United States Patent
Hayashi et al.

(10) Patent No.: US 8,046,411 B2
(45) Date of Patent: Oct. 25, 2011

(54) MULTIMEDIA SHARING IN SOCIAL NETWORKS FOR MOBILE DEVICES

(75) Inventors: Nathanael Joe Hayashi, Piedmont, CA (US); E. Stanley Ott, IV, Palo Alto, CA (US); Audrey Y. Tsang, San Francisco, CA (US); Matthew Fukuda, San Francisco, CA (US); Dan Wascovich, San Francisco, CA (US); Michael Quoc, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 206 days.

(21) Appl. No.: 11/380,871

(22) Filed: Apr. 28, 2006

(65) Prior Publication Data
US 2007/0255785 A1    Nov. 1, 2007

(51) Int. Cl.
*G06F 15/16* (2006.01)

(52) U.S. Cl. ...................................................... 709/204

(58) Field of Classification Search ................ 709/204, 709/206–207, 223
See application file for complete search history.

(56) References Cited

U.S. PATENT DOCUMENTS

| | | | |
|---|---|---|---|
| 5,758,088 A | 5/1998 | Bezaire et al. | |
| 5,996,006 A | 11/1999 | Speicher | |
| 6,021,433 A | 2/2000 | Payne et al. | |
| 6,167,426 A | 12/2000 | Payne et al. | |
| 6,735,614 B1 | 5/2004 | Payne et al. | |
| 7,080,124 B1* | 7/2006 | Shankar | 709/206 |
| 2003/0225834 A1* | 12/2003 | Lee et al. | 709/204 |
| 2005/0144305 A1* | 6/2005 | Fegan et al. | 709/231 |
| 2005/0256866 A1* | 11/2005 | Lu et al. | 707/5 |
| 2005/0262204 A1* | 11/2005 | Szeto et al. | 709/206 |
| 2005/0286546 A1* | 12/2005 | Bassoli et al. | 370/432 |
| 2006/0041601 A1* | 2/2006 | Kim et al. | 707/201 |
| 2006/0161578 A1* | 7/2006 | Siegel et al. | 707/102 |
| 2006/0173909 A1* | 8/2006 | Carlson et al. | 707/104.1 |
| 2007/0005694 A1* | 1/2007 | Popkin et al. | 709/204 |
| 2007/0032244 A1* | 2/2007 | Counts et al. | 455/456.1 |
| 2007/0067707 A1* | 3/2007 | Travis et al. | 715/500.1 |
| 2007/0118794 A1* | 5/2007 | Hollander et al. | 715/512 |
| 2007/0198534 A1* | 8/2007 | Hon et al. | 707/10 |
| 2007/0283241 A1* | 12/2007 | Baldonado et al. | 715/512 |
| 2008/0005064 A1* | 1/2008 | Sarukkai | 707/3 |

OTHER PUBLICATIONS

International Search Report and Written Opinion for International Application No. PCT/US07/66823, filed on Apr. 18, 2007, 11 pages.

\* cited by examiner

*Primary Examiner* — Faruk Hamza
*Assistant Examiner* — Jason Recek
(74) *Attorney, Agent, or Firm* — Frommer Lawrence & Haug LLP; John W. Branch

(57) ABSTRACT

A mobile device, system, and method are directed towards sharing multimedia information on a mobile device based at least in part on vitality information and other social networking information. Multimedia information may be received and/or synchronized on the mobile device based on a relationship between vitality information of members of a social network. The relationship may comprise a common membership in a group, a common multimedia usage behavior, a geographical proximity of members of the social network, a degree of separation of members of the social network, a common search behavior, or the like. Multimedia information captured on the mobile device may be manually and/or automatically annotated and shared with members of the social network. The multimedia information may be displayed in an integrated live view in conjunction with other social networking information.

17 Claims, 7 Drawing Sheets

MULTIMEDIA SHARING IN SOCIAL NETWORKS FOR MOBILE DEVICES

FIELD OF THE INVENTION

The present invention relates generally to mobile communications and, more particularly, but not exclusively to enabling a mobile device member of a social network to share multimedia information based, at least in part, on vitality information and other social networking information.

BACKGROUND OF THE INVENTION

Sharing of multimedia information has become prevalent on mobile devices and has changed our everyday lives. Mobile devices, such as digital cameras, video recorders, PDAs, and cell-phones, increasingly, have become enabled with wireless data connectivity. Users are able to send and receive multimedia information from these mobile devices more readily. However, users cannot easily identify relevant sources of, and recipients for their multimedia information.

Tremendous changes have also been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before.

One aspect of our everyday lives that may benefit from online social networking technology is multimedia information sharing for people on the go based on social networking. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
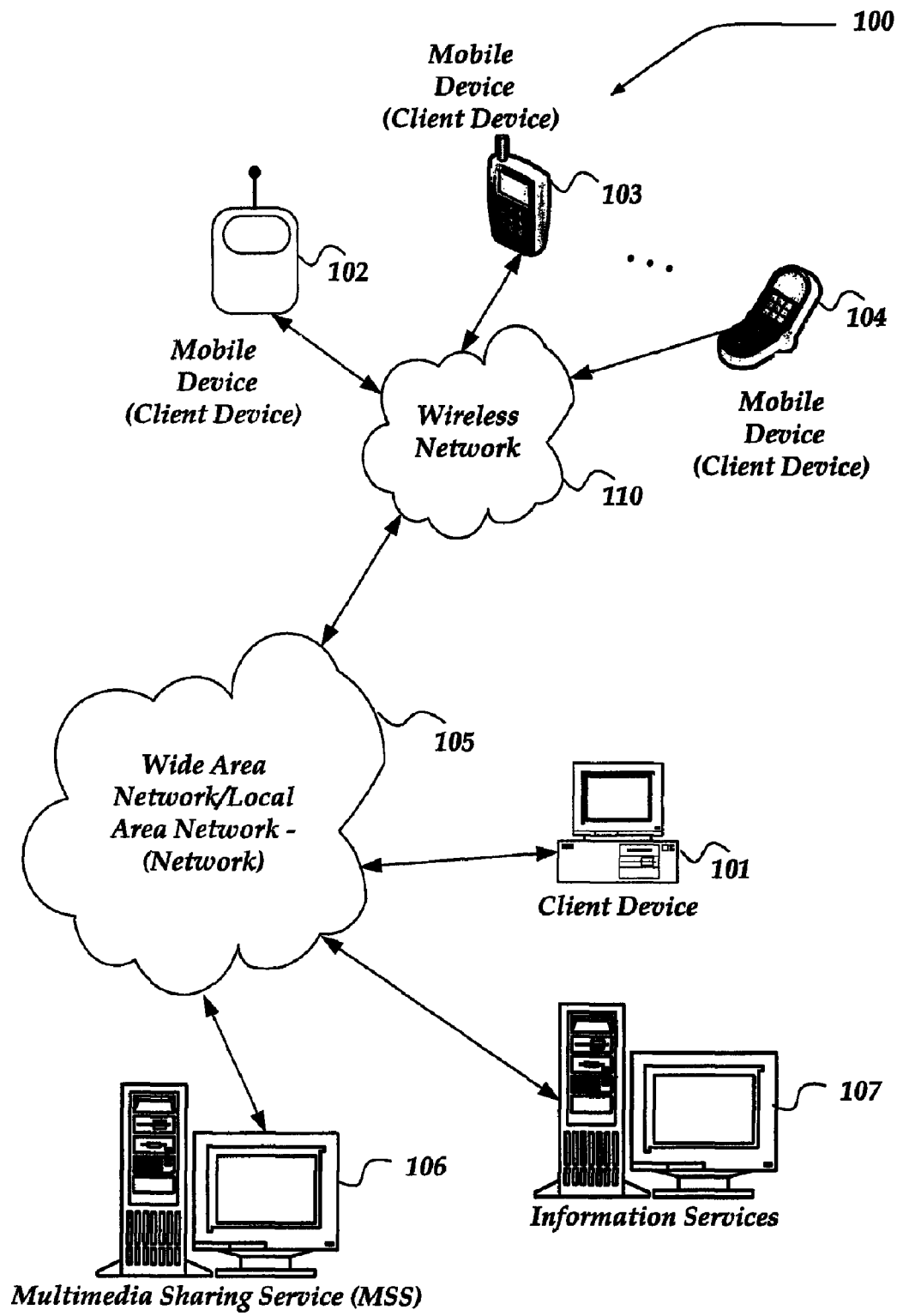
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

As used herein, "live" or a "live view" refers to providing of real-time or approximately real-time data. It is recognized that due to a variety of reasons, transfer of data over a network may be delayed by some varying amount of time. The delay may vary based on conditions of the network, configurations of the network, configuration of the sending and/or receiving device, or the like. Thus, live or a live view may range between real-time data transfers to some varying amount of time delay.

The term "vitality" as used herein refers to online and/or offline activities of a member of a social network. Thus, vitality information is directed towards capturing these aspects of a social community, through various communications between members, and their activities, states, and/or moods of various members, or the like. Vitality information may include, but is not limited to a location of the mobile device, weather information where the member is located, an event, information from the mobile user's calendar or even a friend's calendar, information from the mobile user's task list, past behavior of the mobile user and/or another member of the social network, the mobile user's preferences, a mood of a social network member, a mood of the mobile user, photographs, video files, audio files, internet links, information from a blog, an Really Simple Syndication (RSS) feed, Instant Messages (IMs), blog entries, emails, or the like, and even information about physical (e.g., geographical) proximity of the mobile user's social contacts, what the mobile user is doing at the moment in the real world, or the like. Vitality information however, is not limited to these examples, and other information that may describe the lively, open, or animated aspects of a social network may also be employed.

Moreover, the term "social networking information," includes vitality information. However, social networking information refers to both dynamic as well as less dynamic characteristics of a social network. Social networking information includes various profile information about a member, including, but not limited to the member's avatar, contact information, the member's preferences, degrees of separation between the member and another member, a membership in an activity, group, or the like, or the like.

Social networking information further may include various information about communications between the member and other members in the social network, including, but not limited to emails, SMS messages, IM messages, Multimedia Message (MMS) messages, alerts, audio messages, phone calls, either received or sent by the member, or the like.

Various "meta-data" may also be associated with the social networking information. Thus, for example, various permissions for access may be associated with at least some of the social networking information. Some access permissions (or sharing rules) may be selected, for example, based, in part, on an input by the member, while other access permissions may be defaulted based on other events, constraints, or the like.

The term "multimedia information" as used herein refers to information comprising graphical and/or audio information. Multimedia information may include images, video, animation, audio files, or the like. As used herein, the term "annotation" refers to marking and/or modifying an information with another information.

Briefly stated the present invention is directed towards sharing multimedia information on a mobile device based at least in part on vitality information and other social networking information. Multimedia information may be received and/or synchronized on the mobile device based on a relationship between vitality information of members of a social network. Such vitality information may include moods of a person, avatars, status of an individuals mobile activities including whether they are in an IM session, or the like, as well as other information as described above. The relationship may comprise a common membership in a group, a common multimedia usage behavior, a geographical proximity of members of the social network, a degree of separation of members of the social network, a common search behavior, or the like. Multimedia information captured on the mobile device may be manually and/or automatically annotated and shared with members of the social network. The multimedia information may be displayed in an integrated live view in conjunction with other social networking information. The integrated live views may be provided by employing social networking vitality information to generate an integrated live contact list. Integrated live views may also be provided in a variety of other perspectives, including, but not limited to live: group views, friend views, and activity oriented views, or the like, based on the mobile user's social networking information, including vitality information.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Multimedia Sharing Service (MSS) 106, mobile devices (client devices) 102-104, client device 101, and information services 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, multimedia information, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to MSS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as MSS 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as MSS 106. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

In addition, mobile devices 102-104 may include another application that is configured to enable the mobile user to share and/or receive multimedia information, and to display integrated live views for providing the multimedia information. In one embodiment, each of mobile devices 102-104 may share with and/or receive the multimedia information from MSS 106 and/or from another one of mobile devices 102-104. In conjunction with sharing multimedia information, mobile devices 102-104 may enable an interaction with each other, through sharing various messages, and generally participating in a variety of integrated social experiences beyond merely voice communications or text messages (e.g., IM). In one embodiment, mobile devices 102-104 may enable the interaction with a user associated with received multimedia information. For example, a user of one of mobile devices 102-104 may send a comment on the multimedia information to another user of another one of mobile devices 102-104.

Mobile devices 102-104 may also communicate with non-mobile client devices, such as client device 101, or the like. In one embodiment, such communications may include participation in social networking activities, including sharing of multimedia information.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple MSS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between MSS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of MSS 106 is described in more detail below in conjunction with FIG. 3. Briefly, however, MSS 106 may include any computing device capable of connecting to network 105 to enable sharing of multimedia information based on vitality information and other social networking information. MSS 106 may receive from various participants in a social network, multimedia information, and social networking information, including information associated with activities, moods, events, messages, vitality information, communications, or the like. MSS 106 may also receive social networking information from a variety of other sources including, for example, information services 107. MSS 106 may store at least some of the received multimedia and/or social networking information for use by one or more social networking members. MSS 106 may also enable sharing and/or sending the multimedia information to another network device, including one of client devices 101-104 based on vitality information and/or other social networking information.

Devices that may operate as MSS 106 include personal computers desktop computers, multiprocessor systems, microprocessor-based or programmable consumer electronics, network PCs, servers, and the like.

Although FIG. 1 illustrates MSS 106 as a single computing device, the invention is not so limited. For example, one or more functions of MSS 106 may be distributed across one or more distinct computing devices. For example, managing various social networking activities, including sharing of multimedia information, managing Instant Messaging (IM) session, SMS messages, email messages, sharing of contact information, aggregating and/or storing of social networking information, or the like, may be performed by a plurality of computing devices, without departing from the scope or spirit of the present invention.

Information services 107 represents a variety of service devices that may provide additional information for use in generating live views on mobile devices 102-104. Such services include, but are not limited to web services, third-party services, audio services, video services, multimedia services, email services, IM services, SMS services, VOIP services, calendaring services, multimedia information sharing services, or the like. Devices that may operate as information services 107 include personal computers desktop computers, multiprocessor systems, microprocessor-based or programmable consumer electronics, network PCs, servers, and the like.

Illustrative Mobile Client Environment

Figure 2:
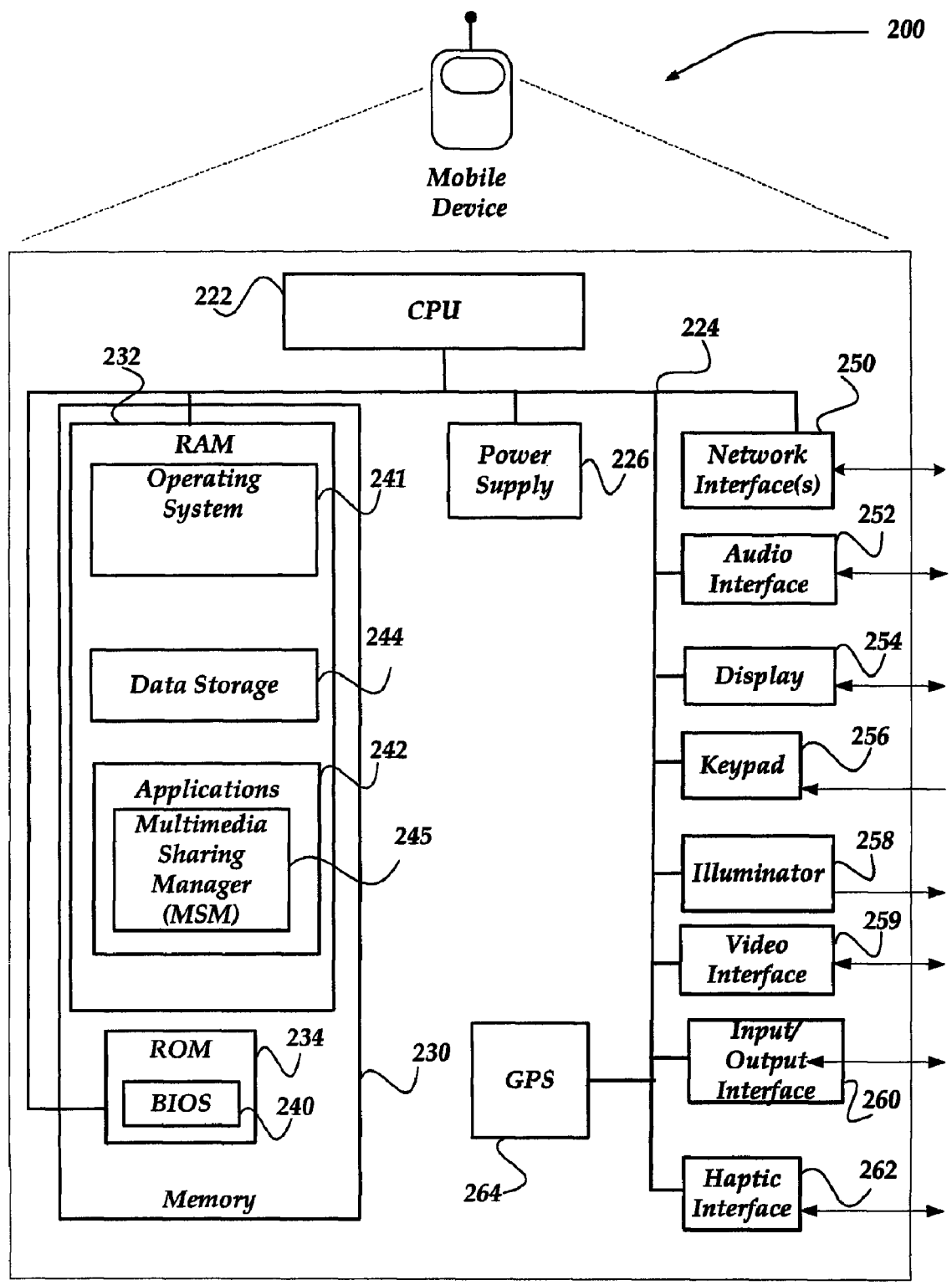
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 World-wide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian (operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store multimedia information and/or social networking information including vitality information, or the like. At least a portion of the multimedia information and/or social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may further include multimedia sharing manager (MSM) 245.

MSM 245 may be configured to send, receive, and manage vitality information and other social networking information. MSM 245 may also determine the vitality information based at least in part on geographical location/proximity information received from GPS 264. MSM 245 may also be configured to share and/or receive multimedia information based on the vitality information and other social networking information. MSM 245 may capture multimedia information from audio interface 252 and/or video interface 259, and may store the multimedia information in data storage 244. MSM 245 may automatically annotate multimedia information based at least in part on vitality information, information from GPS 264, or the like. MSM 245 may also enable manual entry of an annotation through, for example, keypad 256. MSM 245 may send the multimedia information to another device based at least in part on the vitality information and other social networking information. MSM 245 may display an integrated live view on video interface 259 to provide the multimedia information to a user of the mobile device 200. Embodiments of integrated live views are described in more detail below in conjunction with FIG. 6. Moreover, MSM 245 may employ a process substantially similar to that described below in conjunction with FIG. 4.

Illustrative Server Environment

Figure 3:
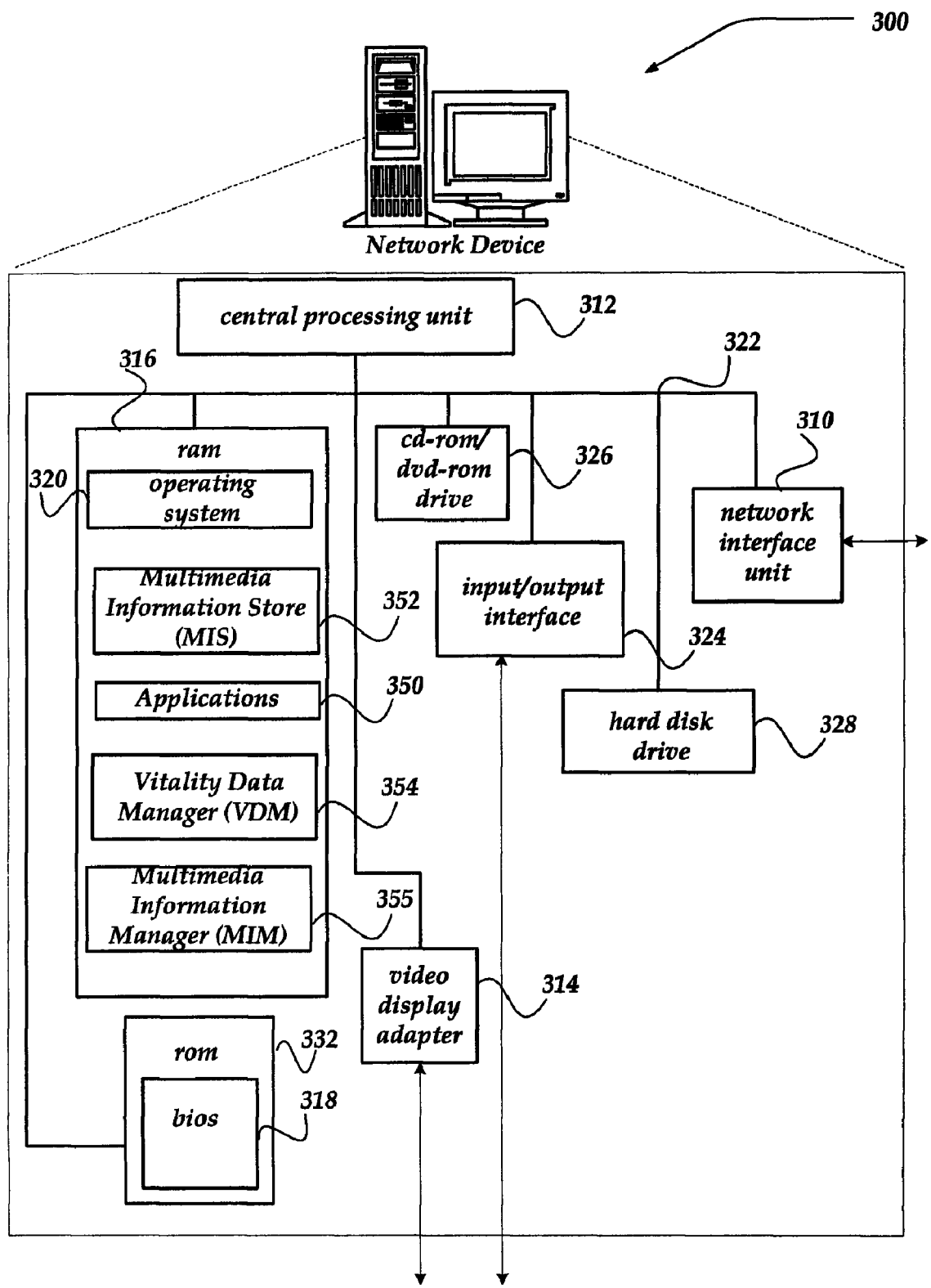
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) 354 and/or Multimedia Information manager (MIM) 355 may also be included as application programs within applications 350.

Multimedia Information Store (MIS) 352 stores a plurality of received multimedia information. In one embodiment, MIS 352 may be a database, a file structure, or the like. MIS 352 may store the multimedia information into a category structure, such as folders, albums, graphs, trees, or the like.

VDM 354 is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM 354 may aggregate or otherwise combine at least some of the received information to generate aggregate vitality information such as a mood of a group, organization, or the like, group events, albums, aggregate music selections, tags, or the like. VDM 354 may store at least some of the received and/or aggregated information in a Vitality Data Store (not shown), which may be implemented as a database, a folder, program, or the like. Vitality Data Store may also distribute at least some of the received and/or aggregated information to one or more social networking members, such as mobile devices 102-104 and/or client device 101 of FIG. 1, or the like.

MIM 355 is configured to receive a variety of multimedia information received from a variety of sources, including client devices 101-104, information services 107, or the like. MIM 355 may operate in conjunction with VDM 352 to determine a relationship between vitality information of members of the social network. MIM 355 may operate in conjunction with VDM 352 to categorize a received multimedia information. MIM 355 may also send at least some of the received multimedia information to a network device, such as one of client devices 101-104. MIM 355 may employ a process substantially similar to that described below in conjunction with FIG. 5.

Generalized Operation

Figure 4:
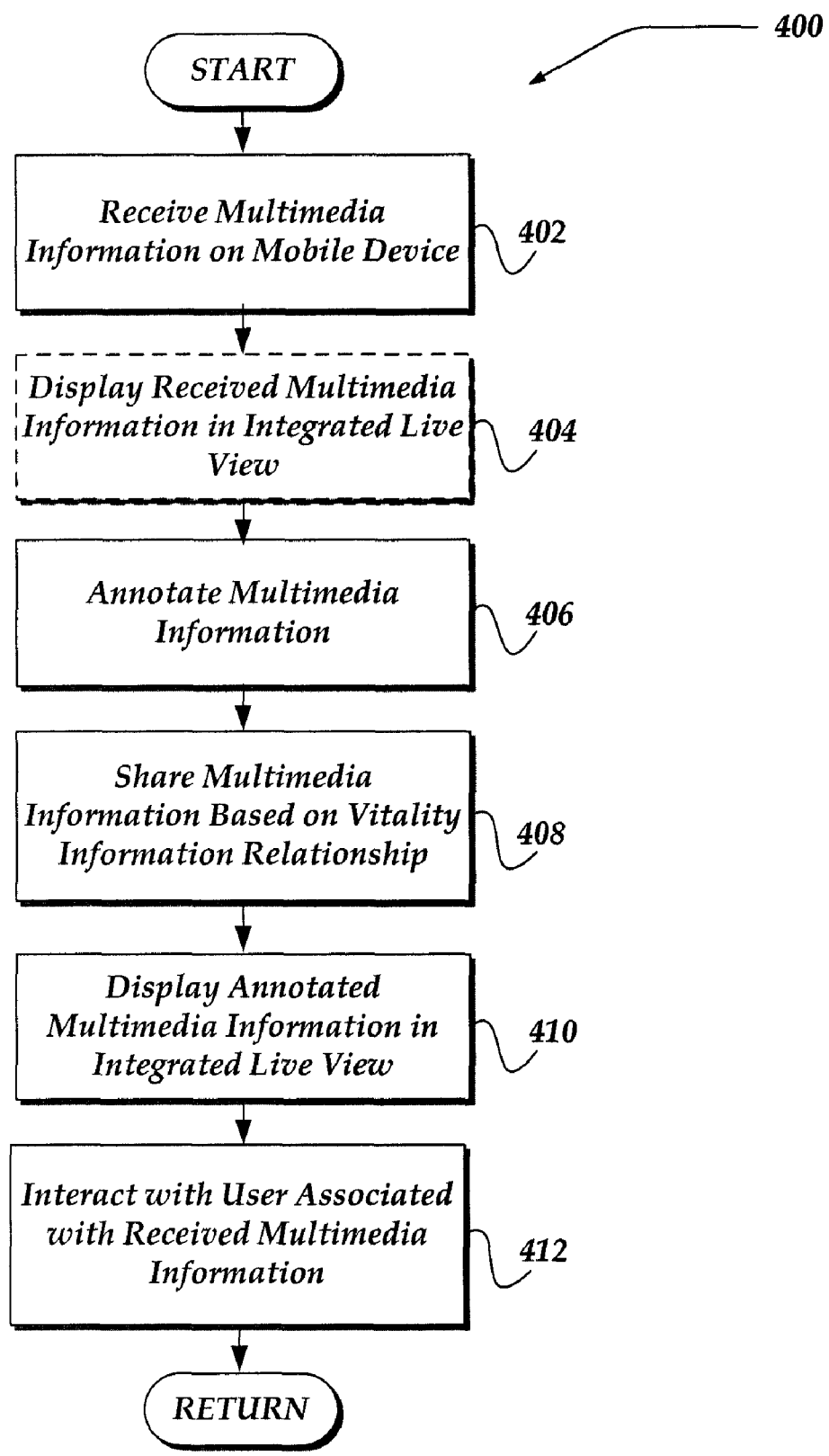
FIG. 4 illustrates a logical flow diagram generally showing one embodiment of a process for end-to-end sharing of multimedia information with a social network.
Figure 5:
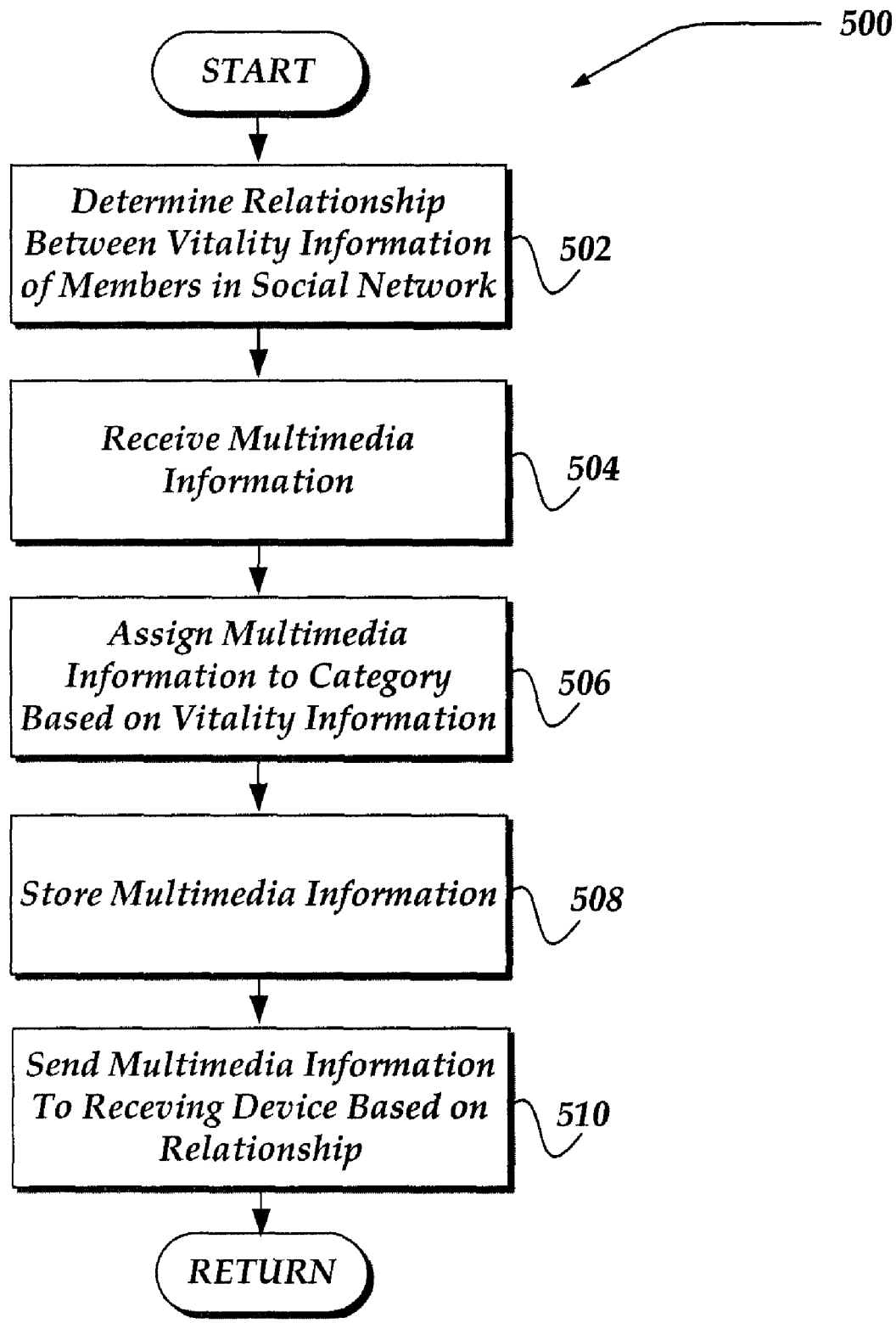
FIG. 5 illustrates another logical flow diagram generally showing one embodiment of a process for end-to-end sharing of multimedia information with a social network.
Figure 6:
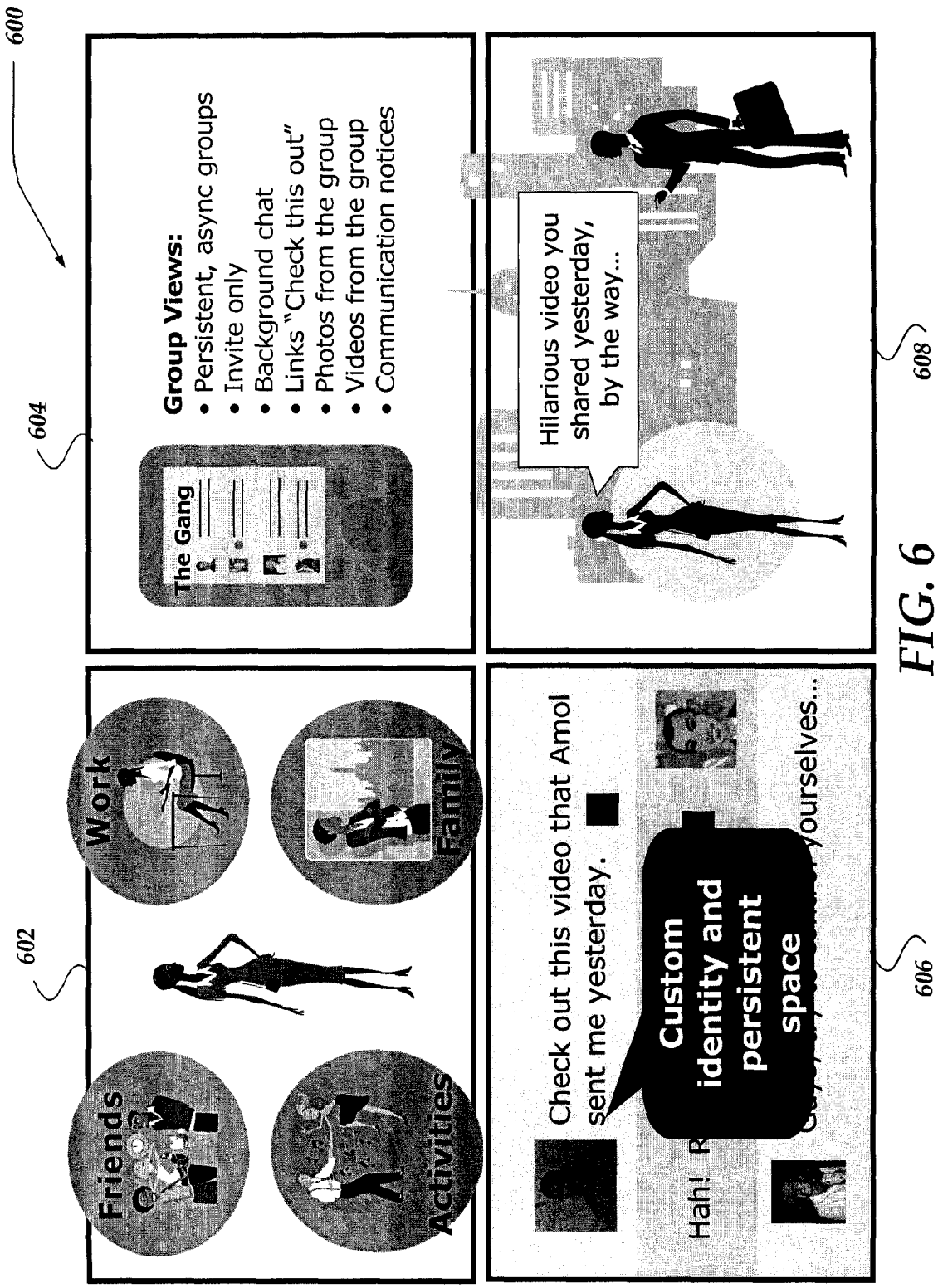
FIG. 6 shows one embodiment of a use case illustrating sharing of multimedia information with a social network in an integrated live view.
Figure 7:
FIG. 7 shows one embodiment of a use case illustrating end-to-end sharing of multimedia information with a social network, in accordance with the present invention.
Figure 7:
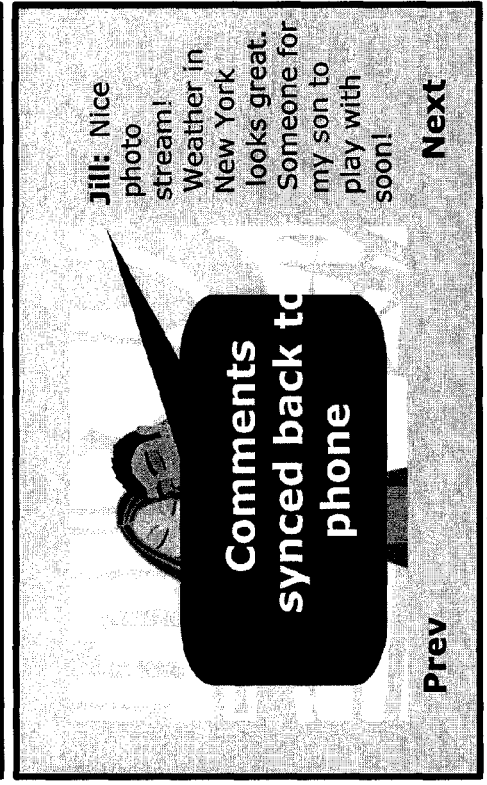
Figure 7:
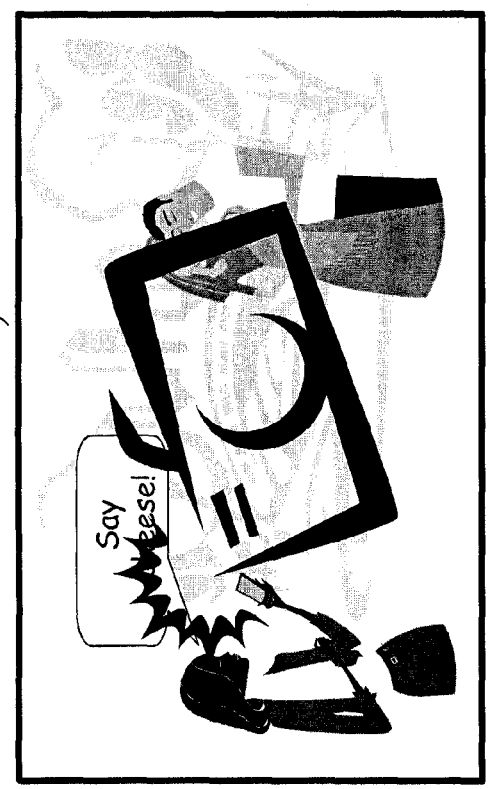
Figure 7:

The operation of certain aspects of the invention will now be described with respect to FIGS. 4-5. FIGS. 4-5 provide logical flow diagrams of certain aspects, while FIGS. 6-7 provide use case examples to further illustrate the invention.

FIG. 4 illustrates a logical flow diagram generally showing one embodiment of a process for end-to-end sharing of multimedia information with a social network. Process 400 of FIG. 4 may be implemented within one of mobile devices 102-104 of FIG. 1.

Process 400 of FIG. 4 begins at block 402, where a mobile device receives multimedia information. In one embodiment, the multimedia information is captured on the mobile device, through for example, a component on the mobile device, such as audio interface 252 and/or video interface 259 of FIG. 2, or another component, such as a photo camera, video camera, microphone, or the like. In another embodiment, the multimedia information is received at the mobile device over a network, such as a wireless network, or the like. In one embodiment, the multimedia information is received, automatically and/or independent of an action of a user.

In one embodiment, the multimedia information is received based at least in part on a relationship between vitality information of the user and other vitality information associated with the social network. In one embodiment, the multimedia information is received based at least in part on another relationship between the vitality information of the user and the multimedia information. In one embodiment, the relationship may comprise at least one of a common membership in a group, a common multimedia usage behavior, a common mood, a geographical proximity of members of the social network, a degree of separation of members of the social network, or a common search behavior. For example, a song received on the mobile device may be shared with another mobile device of another member of the social network who is also in close geographical proximity.

In one embodiment, the multimedia information is received based on a search result. The search result may be based on a search query sent from the mobile device, another device, or the like. In one embodiment, an indication of multimedia information may first be received and may enable the user to further select to receive the multimedia information itself. An indication, may for example, be an alert message, an email message, a phone call, or the like.

In one alternative embodiment, processing next continues to block 404, where the received multimedia information is displayed in an integrated live view for the social network, on the mobile device. In one embodiment, the integrated live view may be substantially similar to blocks 604 and 606 of FIG. 6. In one embodiment, the multimedia information is displayed in the integrated live view for use in engaging in a social networking activity, the multimedia information displayed in association with social networking information, a group, a contact, a task, a proposed event, or a past event. For example, the integrated live view may display what multimedia information is being currently used by a member of the social network (e.g. a song that a particular friend is listening to now). In one embodiment, the integrated live view comprises at least one of a group view, a friends view, an activity oriented view, a chat room, or a contact list view. In another embodiment (not shown), the received multimedia information may not be displayed in an integrated view. Instead, the multimedia information may automatically be used by the user of the mobile device (e.g. an audio file may automatically begin playing).

Processing next continues to block 406, where the multimedia information is annotated. In one embodiment, the multimedia information may be annotated by modifying a field of the multimedia information, appending and/or modifying XML tags (e.g. tagging) of an XML file associated with the multimedia information, or the like. In one embodiment, annotating the multimedia information comprises associating information from the user of the mobile device with the multimedia information, wherein the information from the user comprises at least text information, or another multimedia information. The user information may be entered through a keypad on the mobile device, captured through a component on the mobile device, or the like. In another embodiment, annotating the multimedia information comprises automatically annotating the multimedia information based at least in part on a geographical location of the mobile device, a category identifier in a category structure, a time, an identity of the user of the mobile device, a social networking relationship, a physical proximity between social networking members, or an activity. In one embodiment, the geographical location of the mobile device may be mapped to a text label, such as a name of a building, an address, a landmark, or the like. In one embodiment, the time and/or activity may be mapped to a time of day, a date, a holiday, an event in the user's calendar, or the like. In one embodiment, the category identifier may be the name of a music album, photo album, or the like. In one embodiment, the multimedia information is annotated by modifying the multimedia information with an annotation, such as a text field, another multimedia information, or the like.

Processing next continues to block 408, where the multimedia information is shared, automatically or substantially automatically, with another user based at least in part on vitality information of a social networking relationship, the vitality information associated with at least the user and the other user. As used herein, "automatic" refers to occurring independently of an action of a user, an interaction with the user, or the like. In another embodiment, the multimedia information is shared based on the relationship between the vitality information of the user and the other vitality information associated with the social network. In one embodiment, the multimedia information is sent, automatically, to another mobile device based at least in part on an interaction with another user of the mobile device in an integrated live view, wherein the sending is over a device-to-device wireless protocol, or a client-server protocol. The device-to-device wireless protocol may include Bluetooth, WiMax, or the like. In another embodiment, sharing the multimedia information comprises at least one of automatically sharing, or sharing based on a selection made by a user from an automatically generated recipient template. In one embodiment, the recipient template may be generated based on the social networking relationship of the recipients with the user of the mobile device.

Processing next continues to block 410, where the annotated multimedia information is displayed in an integrated live view on the mobile device. The process of displaying the annotated multimedia information in the integrated live view is substantially similar to block 404. In an alternative embodiment, block 410 occurs between block 406 and block 408.

Processing next continues to block 412, where an interaction with another user associated with the received multimedia information is enabled. In one embodiment, the interaction may involve receiving an indication that the other user has further annotated (e.g. commented on) the shared multimedia information. In another embodiment, the interaction may be a live chat with the other user, an exchange of SMS messages with the other user, a phone call with the other user, or the like. In one embodiment, the other user is associated with the received multimedia information because the other user originated, captured, modified, annotated the multimedia information, or the like. Processing next continues to a calling process for further processing.

In an alternative embodiment, processing begins at block 408, where multimedia information stored on the mobile device is shared based at least in part on vitality information of a social network. Processing next continues to block 410, where the multimedia information is displayed in an integrated live view. Next, at block 412, an interaction with another user associated with the received multimedia information is enabled. Then, processing continues to a calling processing for further processing.

FIG. 5 illustrates another logical flow diagram generally showing one embodiment of a process for end-to-end sharing of multimedia information with a social network. Process 500 of FIG. 5 may be implemented, for example, within MSS 106 of FIG. 1.

Process 500 of FIG. 5 begins at block 502, where a relationship between vitality information of users in a social network is determined at a network device. In one embodiment, the network device may be MSS 106 of FIG. 1. In one embodiment, the relationship comprises at least one of a common membership in a group, a common multimedia usage behavior, a geographical proximity of members of the social network, a common mood, a degree of separation of members of the social network, or a common search behavior. In one embodiment, the multimedia usage behavior may include a prioritized list of often listened, searched, viewed media of members in a social network, or the like. A list may be created for a member associated with a second mobile device based on the aggregate behavior of the associated member and other members. The items in the list may be based on an aggregation of behaviors of members in the social network, or the like. In one embodiment, the aggregation may be weighted by a determined relationship between the associated member and the other members (e.g. based on degrees of separation, proximity, or the like).

Next, processing continues to block 504, where multimedia information is received from at least one of a mobile device or a third-party multimedia source. In one embodiment, the mobile device may be one of mobile devices 102-104 of FIG. 1. In one embodiment, the third-party multimedia source may be information services 107 of FIG. 1. The multimedia information may be captured on the mobile device and sent to the network device, or may be forwarded from the mobile device to the network device, or the like. The third-party multimedia source, such as a photo-sharing web service, may send the multimedia information to the network device. In one embodiment, the received multimedia information may be generated by a plurality of application types, including a video editing program, a music editing program, or the like. In one embodiment, the network device may be sent an indication that the multimedia information is available, and may request the multimedia information from the mobile device and/or third-party multimedia source. In another embodiment, the network device may periodically poll the mobile device and/or third-party multimedia source for the multimedia information. In one embodiment, the multimedia information may be associated with a member of the social network, an interest of a member of the social network, or the like. In one embodiment, the multimedia information may be annotated, for example, by a user of the mobile device, automatically, or by the third-party multimedia source, or the like.

Processing then continues to block 506 where the multimedia information is assigned, automatically, to a category in a category structure. In one embodiment, the category may be an album, a folder, a table in a database, or the like. In one embodiment, the category may be based at least in part on an annotation of the multimedia information, a characteristic, such as a type of the multimedia information (e.g. video, image, voice, music), or the like.

Processing continues to block 508, where the multimedia information is stored, for example, in a database, a server, a file (e.g. text file, XML file), or the like. In one embodiment, the storage may be based at least in part on the assigned category, an annotation of the multimedia information, a characteristic of the multimedia information, or the like. In another embodiment (not shown), processing may continue from block 506 to block 510, without performing block 508.

Processing then continues to block 510 where the multimedia information is sent to the receiving device based at least in part on the determined relationship. Because the multimedia information is sent to a user (e.g. member of the social network) of the receiving device based on the determined relationship, the multimedia information is personally relevant to the user/member. In one embodiment, the receiving device may be any network device, including one of mobile devices 102-104, client device 101, or even information services 107 of FIG. 1. In one embodiment, the multimedia information may be retrieved from a data storage, the third-party source, or the like, and sent to the receiving device. In another embodiment, the multimedia information may be forwarded directly from the mobile device and/or third-party source to the receiving device. In one embodiment, the sending of the multimedia information may be ongoing and continuous. For example, if multimedia information is available, the network device sends the multimedia information. Otherwise, the network device waits for another multimedia information availability. In one embodiment, sending the multimedia information to the receiving device comprises synchronizing, automatically, the multimedia information with another version of the multimedia information on the receiving device. In one embodiment, the synchronizing may be enabled based at least in part on bandwidth, usage history, a time, or the like. In one embodiment, the synchronizing may comprise sending an indication to the receiving device that a newer version of the multimedia information is available, that an older version of the multimedia information on the receiving device should be purged, or the like. Processing next continues to a calling process for further processing.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Cases

FIG. 6 shows one embodiment of a use case illustrating sharing of multimedia information with a social network in a integrated live view. As shown, the mobile user may organize live contact views based on any of a variety of criteria 602, including, family relationships, work relationships, friends, activities, or the like. Thus, integrated live view 604 illustrates one embodiment of a live contact list organized based on whether the social networking member is a member of a group. As shown, the group is labeled "the gang," (which, for example, may represent a friend relationship, an activity relationship, or the like). As shown, live contact list 604 may include members based, for example, on an invite only basis. Moreover, live contact list 604 may be personalized to include links, aggregated communication notices, or the like. The live contact list 604 also includes multimedia information, including photographs from a group (aggregate information), videos from the group, or the like. The multimedia information may be received and/or shared based on processes described in conjunction with FIGS. 4-5, above. It should be clear, that while one mobile device user may employ a group view, other mobile device users associated with the group may employ a different live view, with different social networking information displayed.

Block 606 illustrates that a social networking member may also provide content, such as avatars, multimedia information, or the like, that may be shared by "the gang," shared only by a subset of the "the gang," or the like. In any event, use of personalized live contact lists enable the mobile user to enjoy a more customized 'hang-out' virtual space for communicating, and sharing multimedia information and communication, which may then translate into non-mobile social experiences (see block 608).

FIG. 7 shows one embodiment of a use case illustrating end-to-end sharing of multimedia information with a social network. FIG. 7 illustrates a process substantially similar to that described above in conjunction with FIG. 4. At block 702, a mobile device may be used to capture a multimedia information, such as a photograph.

At block 704, the multimedia information is annotated with information based on the location of the mobile device, a time, an identity of a user of the mobile device, a geographical proximity with another member of the social network, or the like. For example, as shown, the photograph is annotated with the location (e.g. New York), the time (e.g. Labor Day, 2007), the user (e.g. Bill), and information of the identity of another user of another mobile device that is geographically proximate to the mobile device (e.g. Carol). In one embodiment, the mobile device may detect the geographical proximity of the other mobile device and/or the identity of the other user, or the like. In another embodiment, text information may additionally be manually entered (e.g. Bill and Carol). In one embodiment, the process of annotation is substantially similar to blocks 406 of FIG. 4. At block 704, the multimedia information is shared. In one embodiment, the media is uploaded to a network device, a server, a database or the like for sharing. In one embodiment, the sharing process may be substantially similar to block 408 of FIG. 4 and the process of FIG. 5.

At block 706, another device receives the shared multimedia information. The other device may be a network device, such as one of client devices 101-104 of FIG. 1. In one embodiment (not shown), the client device may be a mobile device. The process of receiving the multimedia information is substantially similar to block 402 of FIG. 4. As shown, another user of the network device may modify the multimedia information by adding a comment (e.g. an annotation). The process of annotation is substantially similar to block 406 of FIG. 4.

Next, at block 708, the commented multimedia information is received by, for example, the user that captured the multimedia information, or even other members of the social network. The process of interaction with the user associated with the multimedia information is substantially similar to block 412 of FIG. 4.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A mobile device for sharing information, comprising:
a memory component for storing data; and
a processing component for executing data that performs actions, comprising:
receiving multimedia information;
annotating the multimedia information with at least text information or other multimedia information from a user; and
sharing with another user, independent of an action by the user or the other user, the annotated multimedia information for display in an integrated live view based at least in part on vitality information of a social networking relationship, the vitality information is associated with at least the user and the other user, wherein sharing the annotated multimedia information with the other user further comprises automatically synchronizing the annotated multimedia information of the user to include a modified annotated version of the annotated multimedia information based on a relationship between vitality information of members of a social network, wherein the modification to the annotated multimedia information is made by the other user.

2. The mobile device of claim 1, the actions further comprising:
displaying the multimedia information in an integrated live view for use in engaging in a social networking activity, the multimedia information displayed in association with social networking information, a group, a contact, a task, a proposed event, or a past event.

3. The mobile device of claim 1, wherein annotating the multimedia information comprises automatically annotating the multimedia information based at least in part on a geographical location of the mobile device, a category identifier in a category structure, a time, an identity of the user of the mobile device, a social networking relationship, a physical proximity between social networking members, or an activity.

4. A mobile device for sharing information, comprising:
a memory component for storing data; and
a processing component for executing data that performs actions, including:
receiving or synchronizing, independent of an action of a user, an indication of a multimedia information based at least in part on a relationship between vitality information of the user and other vitality information associated with a social network;
modifying the multimedia information with an annotation from the user, the annotation comprising at least text information or other multimedia information; and
sharing with a member of the social network, independent of an action of the user or the member of the social network, the annotated multimedia information for display in an integrated live view based at least in part on the relationship, wherein sharing the annotated multimedia information with the member further comprises automatically synchronizing, based on a relationship between vitality information of members of the social network, the annotated multimedia information of the user to include a modified annotated version of the annotated multimedia information, wherein the modification to the annotation is made by the member.

5. The mobile device of claim 4, the actions further comprising:
enabling an interaction with another user associated with the received multimedia information.

6. A non-transitory processor readable storage medium that includes data, wherein the execution of the data provides for sharing information over a network by performing actions, comprising:
receiving, automatically, an annotated multimedia information at a mobile device, based at least in part on a relationship between vitality information of a user and the multimedia information, the annotation comprising at least text information or other multimedia information from the user;
synchronizing based on a relationship between vitality information of members of a social network, the annotated multimedia information of the user to include a modified annotated version of the annotated multimedia information, wherein the modification to the annotation is made by the other user; and
displaying the synchronized annotated multimedia information in an integrated live view.

7. The non-transitory processor readable storage medium of claim 6, wherein receiving is further based on another relationship between the vitality information of the user and other vitality information associated with the social network.

8. The non-transitory processor readable storage medium of claim 6, wherein receiving the multimedia information at the mobile device is further based on a search result.

9. The non-transitory processor readable storage medium of claim 6, the actions further comprising annotating, automatically, the multimedia information based at least in part on a location of the mobile device.

10. The non-transitory processor readable storage medium of claim 6, further comprising:
sending, automatically, the annotated multimedia information to another mobile device based at least in part on an interaction with another user of the other mobile device in an integrated live view, wherein the sending is over a device-to-device wireless protocol, or a client-server protocol.

11. A method for managing a mobile communication, comprising:
annotating multimedia information with at least text information or other multimedia information from a user;
sharing with another user the annotated multimedia information with a mobile device, independent of an action of the user or the other user, based at least in part on a relationship between vitality information of users in a social network;
synchronizing, based on the relationship between vitality information of users of the social network, the annotated multimedia information of the user to include a modified annotated version of the annotated multimedia information, wherein the modification to the annotation is made by the other user; and
displaying the synchronized shared annotated multimedia information in an integrated live view for the social network on the mobile device.

12. The method of claim 11, wherein sharing the multimedia information further comprises at least one of automatically sharing or sharing based on a selection from an automatically generated recipient template.

13. The method of claim 11, further comprising annotating, automatically, the multimedia information based at least in part on a geographical location of the mobile device.

14. The method of claim 11, wherein the integrated live view for the social network further comprises at least one of a group view, a friend's view, an activity oriented view, a chat room, or a contact list view.

15. A network device to manage a mobile communication, comprising:
    a transceiver to send and receive data over a network; and
    a processor that is operative to perform actions, comprising:
        determining a relationship between vitality information of users in a social network;
        receiving multimedia information from at least one of a first mobile device or a third-party multimedia source;
        annotating the multimedia information with at least text information or other multimedia information from a user; and
        sending the annotated multimedia information to a second mobile device for display in an integrated live view, independent of an action of the user or a user of the second mobile device, based at least in part on the determined relationship, wherein sending the annotated multimedia information to the second mobile device further comprises automatically synchronizing, based on the relationship between vitality information of users of the social network, the annotated multimedia information of the user to include a modified annotated version of the annotated multimedia information, wherein the modification to the annotation is made by the user of the second mobile device.

16. The network device of claim 15, wherein the determined relationship further comprises at least one of a common membership in a group, a common multimedia usage behavior, a geographical proximity of members of the social network, a common mood, a degree of separation of members of the social network, or a common search behavior.

17. The network device of claim 15, the actions further comprising:
    assigning, automatically, the multimedia information to a category in a category structure based at least in part on an annotation of the multimedia information.

* * * * *